United States Patent
Rácz et al.

(10) Patent No.: US 12,128,546 B2
(45) Date of Patent: Oct. 29, 2024

(54) TECHNIQUE FOR ROBOTIC DEVICE CONTROL

(71) Applicant: Telefonaktiebolaget LM Ericsson (publ), Stockholm (SE)

(72) Inventors: Sándor Rácz, Cegléd (HU); Norbert Reider, Tényö (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1047 days.

(21) Appl. No.: 16/979,204

(22) PCT Filed: Jun. 12, 2018

(86) PCT No.: PCT/EP2018/065515
§ 371 (c)(1),
(2) Date: Sep. 9, 2020

(87) PCT Pub. No.: WO2019/238219
PCT Pub. Date: Dec. 19, 2019

(65) Prior Publication Data
US 2020/0406471 A1    Dec. 31, 2020

(51) Int. Cl.
*B25J 13/00*    (2006.01)
*B25J 9/00*    (2006.01)
(Continued)

(52) U.S. Cl.
CPC .......... *B25J 13/006* (2013.01); *B25J 9/0084* (2013.01); *H04B 7/0617* (2013.01); *H04B 7/0695* (2013.01); *H04B 7/0857* (2013.01)

(58) Field of Classification Search
CPC ..... B25J 13/006; B25J 9/0084; H04B 7/0617; H04B 7/0695; H04B 7/0857
See application file for complete search history.

(56) References Cited

U.S. PATENT DOCUMENTS

| | | | |
|---|---|---|---|
| 8,653,967 B1 * | 2/2014 | Vosburgh | B63B 22/18 340/3.1 |
| 9,008,839 B1 | 4/2015 | Kuffner, Jr. et al. | |

(Continued)

FOREIGN PATENT DOCUMENTS

| | | |
|---|---|---|
| EP | 2703921 A1 | 3/2014 |
| EP | 2884583 A1 | 6/2015 |

(Continued)

OTHER PUBLICATIONS

First Examination Report Action mailed Nov. 29, 2021 for Indian Patent Application No. 202047038783, 6 pages.

(Continued)

*Primary Examiner* — Jaime Figueroa
*Assistant Examiner* — Mohamad O El Sayah
(74) *Attorney, Agent, or Firm* — Sage Patent Group

(57) ABSTRACT

A robotic device control system is described. The robotic device control system includes: a radio base station for wireless communication with a robotic device; a beamforming controller coupled or integral to the radio base station for controlling beamforming between the radio base station and the robotic device; and a robotic device controller coupled to the beamforming controller, wherein the robotic device controller is configured to control the robotic device via the radio base station; wherein the robotic device control system is configured to provide an instruction, derived by the robotic device control system based on radio beam propagation information of the wireless communication between the radio base station and the robotic device, to the beamforming controller for controlling beamforming between the radio base station and the robotic device.

18 Claims, 3 Drawing Sheets

(51) Int. Cl.
*H04B 7/06* (2006.01)
*H04B 7/08* (2006.01)

(56) References Cited

U.S. PATENT DOCUMENTS

| | | | |
|---|---|---|---|
| 9,630,324 B2 | 4/2017 | Cohen et al. | |
| 10,340,996 B1* | 7/2019 | Wakid | H04B 7/0639 |
| 11,398,856 B2* | 7/2022 | Vu | H04B 17/318 |
| 2013/0297069 A1* | 11/2013 | Tachiwa | B25J 9/16 |
| | | | 700/245 |
| 2014/0044042 A1* | 2/2014 | Moshfeghi | H04B 17/309 |
| | | | 370/328 |
| 2014/0286251 A1* | 9/2014 | Kohli | H04W 24/04 |
| | | | 370/329 |
| 2015/0264593 A1 | 9/2015 | Goldhamer | |
| 2016/0023351 A1* | 1/2016 | Kuffner | G06N 3/008 |
| | | | 901/47 |
| 2016/0049823 A1* | 2/2016 | Stein | H04W 4/24 |
| | | | 320/108 |
| 2016/0049824 A1 | 2/2016 | Stein et al. | |
| 2016/0121487 A1* | 5/2016 | Mohan | B25J 9/0084 |
| | | | 700/250 |
| 2017/0059688 A1* | 3/2017 | Gan | G01S 3/325 |
| 2018/0152850 A1* | 5/2018 | Lee | H04W 16/28 |
| 2018/0321687 A1* | 11/2018 | Chambers | G06Q 30/0261 |
| 2019/0006754 A1* | 1/2019 | Pallister | H04B 7/0617 |
| 2019/0053296 A1* | 2/2019 | Balappanavar | H04B 7/0617 |
| 2019/0281473 A1* | 9/2019 | Liao | H04W 48/16 |
| 2019/0349063 A1* | 11/2019 | Takano | H04W 28/0215 |
| 2020/0382184 A1* | 12/2020 | Shimizu | H04W 28/0289 |

FOREIGN PATENT DOCUMENTS

| | | |
|---|---|---|
| WO | 2015096809 A1 | 7/2015 |
| WO | 2018033203 A1 | 2/2018 |

OTHER PUBLICATIONS

PCT International Search Report and Written Opinion mailed on Feb. 26, 2019 for International Application PCT/EP2018/065515, 12 pages.

Agiwal, Mamta et al., "Next Generation 5G Wireless Networks: A Comprehensive Survey", IEEE Communications Surveys & Tutorials IEEE, USA, vol. 18, No. 3, Feb. 19, 2016, pp. 1617-1655.

* cited by examiner

TECHNIQUE FOR ROBOTIC DEVICE CONTROL

CROSS-REFERENCE TO RELATED APPLICATIONS

This application is a 35 U.S.C. § 371 national stage application for International Application No. PCT/EP2018/065515, entitled "TECHNIQUE FOR ROBOTIC DEVICE CONTROL", filed on Jun. 12, 2018, the disclosures and contents of which are hereby incorporated by reference in their entireties.

TECHNICAL FIELD

The present disclosure relates to a robotic device control system, a method for controlling a robotic device, and a computer program product comprising program code portions for performing the method for controlling the robotic device.

BACKGROUND

Today, there is a clear trend in manufacturing that customers would like to have more and more personalized products, which may require high flexibility, for instance, to re-arrange the complete production line in a relatively short time, and to immediately re-program all of the devices accordingly. Such flexibility may be achieved, for instance, by moving functionalities to a central place (for example to a local cloud), and by replacing cables with wireless solutions.

Moving robotics and automation algorithms into the Cloud requires frameworks that facilitate this transition. The Cloud provides three possible levels at which a framework could be implemented. The lowest level is Infrastructure as a Service (IaaS), where bare operating systems are provided on (possibly virtualized) machines in the Cloud. The second level, Platform as a Service (PaaS), provides more structure, including application frameworks and database access, while restricting the choice of programming languages, system architectures, and database models that can be used. Software as a Service (SaaS), the highest level of structure, is typically not available for the robotics domain at present.

The current focus of cloud-based robotics is to either speed up the processing of input data collected from many sensors with big data computation. Another approach is to collect various knowledge bases in a centralized location (in the cloud), for example possible grasping poses of various three-dimensional objects.

Current industrial robot deployments consist, for example, of a robotic arm and a controller deployed very close to it. The controller has predefined commands that have to be performed. The controller and the arm are connected to each other via proprietary industrial protocols.

Prior art can be found, for example, in EP 2 703 921 A1, which generally relates to a method for controlling a machine via a control unit, and EP 2 884 583 A1, which generally relates to beamforming for an industrial system.

Controlling a robot from the cloud is currently out of the scope of the robotics industry due to lack of trustworthy low delayed wireless/wired link and strategic decisions.

SUMMARY

The inventors have realized that wireless access to actuators/sensors/controllers in industrial environments in which robotic devices are deployed is a promising use-case for beamforming technology, in particular cloud-based coordinated beamforming for robot cells. In order to increase channel reliability and spectrum efficiency, beamforming technology has been identified by the inventors as being advantageous.

A robotic device control system, a method for controlling a robotic device, and a computer program product comprising program code portions for performing the method for controlling the robotic device according to the present disclosure are set out in the independent claims. Example implementations thereof are outlined in the dependent claims.

According to an aspect of the present disclosure, there is provided a robotic device control system comprising: a radio base station for wireless communication with a robotic device; a beamforming controller coupled or integral to the radio base station for controlling beamforming between the radio base station and the robotic device; and a robotic device controller coupled to the beamforming controller, wherein the robotic device controller is configured to control the robotic device via the radio base station; wherein the robotic device control system is configured to provide an instruction, derived by the robotic device control system based on radio beam propagation information of the wireless communication between the radio base station and the robotic device, to the beamforming controller for controlling beamforming between the radio base station and the robotic device.

As will be appreciated, the robotic device may or may not form part of the robotic device control system.

The robotic device controller may hereby provide data, comprising an instruction for controlling the robotic device, to the beamforming controller. The robotic device controller may control the robotic device via the radio base station using beams formed between the radio base station and the robotic device.

The instruction which is provided by the robotic device control system to the beamforming controller for controlling beamforming between the radio base station and the robotic device may comprise one or more data records containing one or more of the following: a robotic device ID, a cell-ID of a cell in which the robotic device is deployed, an ID of a user operating the robotic device control system, a beam direction from the radio base station to the robotic device, an estimated path loss of a beam between the radio base station and the robotic device, a beam type such as, but not limited to an indication as to whether the beam is a line-of-sight or a non-line-of-sight beam between the radio base station and the robotic device, and a validity period, as will be further outlined below.

The radio beam propagation information of the wireless communication between the radio base station and the robotic device may hereby be published to external components, such as a wireless access network, for further processing. The published one or more data records may hereby be used in order to optimize, for example, the beamforming configuration and to decrease the number of radio measurements which may need to be performed in order to find a preferred beam of a plurality of beams which may be used for the wireless communication between the radio base station and the robotic device.

In some example implementations of the robotic device control system, the beamforming relates to a spatial selectivity with respect to beams, emitted by the radio base station in different directions, from which one beam is selected for the wireless communication. Beamforming may therefore be used in order to establish directional signal transmission between the radio base station and the robotic device. The person with skill in the art will hereby understand as to how beamforming may be performed, for example, by combining elements in an antenna array of the radio base station such that signals emitted at particular angles from the radio base station experience constructive interference, while others experience destructive interference. Furthermore, the skilled person will be familiar with techniques for controlling phase and amplitude of signals emitted from the radio base station for the (directional) beamforming.

In some variants of the robotic device control system, the robotic device controller is comprised in a cloud-computing environment, and wherein the beamforming controller is comprised in a wireless access network via which the beamforming controller is in communication with the robotic device controller.

It is hereby to be noted that cloud-computing enables access to shared pools of configurable system resources and high-level services, in particular the services as outlined above (IaaS, PaaS, SaaS). The cloud-computing environment may therefore provide access to IT resources, for example over the Internet. The cloud-computing environment provides access to one or more of servers, databases and applications.

The skilled person will be familiar with cloud-computing implementations which may allow, for example, providing instructions to the robotic device from the robotic device controller, whereby the instructions are derived and/or processed in the cloud-computing environment using, for example, a server, database and application, as outlined above.

In further example implementations of the robotic device control system, the robotic device controller is coupled to the beamforming controller via a robotic controller-assisted radio beamforming unit which is configured to derive the instruction provided to the beamforming controller for controlling beamforming between the radio base station and the robotic device. The robotic controller-assisted radio beamforming unit may therefore be used in order to process any data which may then be comprised in or result in the instruction which is provided to the beamforming controller.

In some variants, the robotic controller-assisted radio beamforming unit is comprised in the cloud-computing environment. This may allow making use of the large processing power of, for example, servers comprised in the cloud.

In some example implementations, the robotic device control system further comprises a robotic device instruction descriptor interface comprised in the cloud-computing environment for providing the instruction to the beamforming controller. The robotic device instruction descriptor interface may function as a data descriptor containing information for describing the instruction provided to the beamforming controller.

In some variants of the robotic device control system, the radio beam propagation information comprises a beam type identifying whether a beam formed between the radio base station and the robotic device is a line-of-sight beam or a non-line-of-sight beam. This information regarding the beam type may then be used when deriving the instruction to the beamforming controller for optimizing controlling beamforming between the radio base station and the robotic device. It will be understood that deriving the instruction based on the beam type may be performed, for example, in the robotic controller-assisted radio beamforming unit, or in the beamforming controller itself.

In some example implementations, the robotic device control system is configured to prioritize, for the wireless communication, line-of-sight beams over non-line-of-sight beams during the beamforming control. An optimized (for example stronger) signal may therefore be established using a line-of-sight beam for the wireless communication between the radio base station and the robotic device.

In some variants, the robotic device control system is further configured to determine a signal strength attenuation of the beam caused by one or both of (i) a distance between the radio base station and the robotic device, and (ii) an object obstructing a wireless communication path between the radio base station and the robotic device, and wherein the deriving of the instruction provided to the beamforming controller is based on the determined signal strength attenuation. This may be achieved, for example, by performing radio measurements using the radio base station. Additionally or alternatively, radio measurements may be performed by the robotic device and data relating to those radio measurements may then be forwarded to the robotic device control system (for example to the radio base station). The determination of the signal strength attenuation of the beam may then be used when deriving the instruction to the beamforming controller for controlling beamforming between radio base station and the robotic device. A preferred beam (i.e. propagating in a preferred direction) may therefore be found based on signal strength attenuation obtained for multiple beams which may be established between the radio base station and the robotic device.

In some example implementations, the robotic device control system is further configured to determine a reflection direction of the non-line-of-sight beam from a surface, and wherein the deriving of the instruction provided to the beamforming controller is based on the determined reflection direction. This may allow for further optimization during the beamforming controlling in which a preferred beam propagating in a particular direction between the radio base station and the robotic device may be determined.

In some variants, the robotic device control system further comprises an object-material database in which a radio beam-related property of one or both of the obstructing object and the surface is stored, and wherein the deriving of the instruction provided to the beamforming controller, for controlling the non-line-of-sight beam, is based on the radio beam-related property. This may be particularly useful in case the obstructing object and/or the surface are provided at a fixed position. However, the robotic device control system may additionally or alternatively store any information in a database, for example the object-material database, which comprises position information of such an obstructing object and/or surface which may change their position over time.

The radio beam-related property may, for example, relate to a radio beam attenuation property. Such radio beam attenuation property of the obstructing object and/or surface may then be taken into consideration when deriving the instruction which is provided to the beamforming controller for controlling beamforming between the radio base station and the robotic device. This may allow for optimizing controlling beamforming for finding a preferred beam which may be used for wireless communication between the radio base station and the robotic device.

In some example implementations, the object-material database is comprised in the cloud-computing environment. This may allow for exploiting the large storage capacity of the cloud.

In some variants of the robotic device control system, if line-of-sight propagation is available for M beams of a plurality of beams formed between the radio base station and the robotic device, wherein M ∈ N, the instruction comprises a first identification of the M beams including an order of preference of the M beams for the wireless communication, and wherein the beamforming controller is configured to validate a first beam of the M beams for the wireless communication for which a highest preference among the M beams has been identified and to validate N second beams of the plurality of beams for the wireless communication, wherein the N second beams are neighboring beams of the first beam of the M beams, the validations being based on radio measurements performed by the robotic device control system on the first beam of the M beams and the N second beams, and wherein the beamforming controller is configured to establish the wireless communication based on the first beam or one of the N second beams according to the validations. Therefore, if line-of-sight propagation is available, then the beamforming controller may validate a best proposed beam using collected radio measurements on the predicted and N neighboring beams (with, for example, N=2). This may allow further optimizing beamforming controlling, in particular as a beam which may be predicted to be the best beam (i.e. with the most preferred beam quality, such as, for example, highest signal strength) using, for example, solely information regarding a beam direction of the beam between the radio base station and the robotic device, may in fact in reality not be what may be considered the best beam, for example, based on the signal strength of the beam derived from radio measurements.

In some example implementations of the robotic device control system, the M beams comprise the N second beams. In other words, the N second beams may also all be line-of-sight beams. As will be appreciated, in some examples, the N second beams may comprise both line-of-sight beams and non-line-of-sight beams.

In some variants of the robotic device control system, if no line-of-sight propagation is available, the robotic device control system is configured to increase the number N of second beams validated by the beamforming controller, and wherein the beamforming controller is configured to establish the wireless communication based on one of the N second beams according to the validations. The beamforming controller may therefore be able to check more beams based on which the wireless communication between the radio base station and robotic device may be established within the beamforming procedure.

In some example implementations of the robotic device control system, if no line-of-sight propagation is available, the robotic device control system is configured to: determine whether a property of the wireless communication which is established based on the one of the N second beams satisfies a condition, and if the condition is satisfied, vary one or both of (i) a time interval between consecutive radio measurements and (ii) the number N of second beams. In some examples, the condition is based on a line-of-sight propagation-based property of the wireless communication determined previously by the robotic device control system.

The condition may, for example, be an accuracy of an estimation for the beam with the highest quality (for example highest signal strength). In some examples, this estimation may be provided by the robotic controller-assisted radio beamforming unit.

In some example implementations, in case the accuracy of the best beam estimation(s) reaches a threshold determined by the line-of-sight propagation-based property determined previously by the robotic device control system, then the radio measurement periodicity may be decreased, for example, to 500 ms, and/or the number N of measured beams may be decreased such that N may be significantly smaller than the total number of potentially available beams for wireless communication between the radio base station and the robotic device. This may allow for considerably reducing the number of measurements which may need to be performed and reducing the reporting load of any wireless devices, which may, for example, be comprised in the robotic device or the radio base station.

In some variants of the robotic device control system, when the line-of-sight propagation becomes invalid and/or the beam for which the highest preference for the wireless communication has been identified changes, the robotic device control system is configured to vary one or both of a periodicity of the radio measurements and a number of the beams to be validated.

Furthermore, in some example implementations, the robotic device control system is configured to switch off beams, of the plurality of beams, which are not validated (at a given time) by the beamforming controller. Energy efficiency of the robotic device control system may therefore be improved.

In some variants, the robotic device control system is configured to process movement data relating to a movement of one or both of the robotic device and a third object to obtain predicted movement data indicating a predicted position and/or a predicted orientation of the robotic device and/or the third object, wherein the instruction to the beamforming controller comprises the predicted movement data for controlling beamforming between the radio base station and the robotic device for a later point in time compared to when the movement data is obtained and/or processed. This may allow for optimizing beamforming controlling further using the predicted movement data.

Position and/or orientation of moving controlled objects (for example, an arm of the robotic device) may be collected, for example, from the robotic device controller and/or from one or more sensors (for example camera sensor(s)).

Position and/or orientation of externally controlled moving objects (for example automated guided vehicle(s)) or an uncontrolled object (for example a human) may be collected from one or more sensors (for example camera sensor(s) and/or LIDAR and/or proximity sensor(s)).

In some example implementations of the robotic device control system, the instruction further comprises validity period information indicating a maximum time period between when the movement data is obtained and the later point in time. The validity period information may therefore indicate that the information record may be a predicted one and for how far into the future it may be valid.

In some variants, when a radio propagation measurement relating to a beam determined for use for the wireless communication at the later point in time is not performed at a current time, the robotic device control system is configured to initiate the radio propagation measurement for said beam. This may allow for optimizing beamforming control, in particular as, for example, signal strength measurements of said beam may be used when deriving the instruction which is to be provided to the beamforming controller for controlling beamforming between the radio base station and the robotic device. In some example implementations, the beamforming controller may start using the predicted best beam for the given robotic device.

In some variants of the robotic device control system, initiating the radio propagation measurement for said beam comprising switching on said beam if the beam is switched off at the current time.

Using the predicted best beam information, for example, from the robotic controller-assisted radio beamforming unit, the beamforming controller may, for example, follow movement of objects and/or the robotic device in order to determine the best beam for the robotic device with minimized error. The beamforming controller may hereby be coupled to the one or more sensors used for position and/or orientation determination of moving controlled and/or externally controlled moving objects as outlined above.

In some variants of the robotic device control system, the movement data is processed by the beamforming controller. However, as will be appreciated, processing the movement data may additionally or alternatively be performed by any of the above-identified devices which may be comprised in the cloud-computing environment.

In some example implementations, the robotic device control system is configured to predict one or both of the position and orientation of the robotic device based on instruction data communicated to the robotic device. This information may be used for predicting the best beam at a later point in time.

In some variants of the robotic device control system, the radio base station comprises a plurality of radio base stations, and wherein the instruction to the beamforming controller for controlling beamforming between the radio base station and the robotic device is derived based on a comparison of radio beam propagation information of the wireless communication between the robotic device and each respective one of the plurality of radio base stations. Interference between different beams from different radio base stations may hereby be taken into consideration when deriving the instruction to the beamforming controller for controlling beamforming between the radio base station and the robotic device.

In some example implementations of the robotic device control system, the beamforming controller is configured to provide feedback regarding the derived instruction in relation to a preferred beam utilized for the wireless communication, and wherein the robotic device control system is configured to refine the beamforming based on a comparison, using the feedback, between the derived instruction and a radio signal strength measurement-based beam evaluation. Beamforming between the radio base station and the robotic device may hereby be optimized.

In some variants of the robotic device control system, the radio beam propagation information comprises data relating to an interference of different, respective beams used to communicate with the robotic device.

In some further variants of the robotic device control system, the interference comprises interferences of beams formed by different radio base stations.

As outlined above, taking interference between different beams into consideration may allow for optimizing beamforming controlling.

In some example implementations, the robotic device control system is configured to derive the radio beam propagation information based on a three-dimensional map of an area coverable by beams of the radio base station. The three-dimensional map may hereby be obtained using, for example, the above-identified camera sensor(s), robotic device controller, LIDAR and/or proximity sensor(s).

In some example implementations, the robotic device control system is configured to update the three-dimensional map based on objects, in particular the robotic device, moving within the area. This may be particularly useful in the beamforming controlling when deriving the instruction to the beamforming controller, wherein the instruction is based, for example, on the beam type which identifies whether a beam formed between the radio base station and the robotic device is a line-of-sight beam or a non-line-of-sight beam. This information may therefore be updated regularly and provided when deriving the instruction provided to the beamforming controller.

In some variants, the robotic device control system further comprises a layout database storing information regarding the three-dimensional map, wherein deriving the instruction based on the radio beam propagation information is based on the information stored in the layout database. In some example implementations, the layout database may be stored in the cloud-computing environment such that the large storage capacity of the cloud may be exploited.

In a related aspect according to the present disclosure, there is provided a method for controlling a robotic device, the method comprising: providing the robotic device control system of any one of the aspects, variants and example implementations as described above, and controlling beamforming, based on a selection of a beam, from a plurality of beams propagating into different, respective spatial directions, for wireless communication between the radio base station and the robotic device to control the robotic device.

We further describe a computer program product comprising program code portions for performing the above method when the computer program product is executed on one or more computing devices. In some example implementations, the computer program product may be stored on a computer-readable recording medium.

According to a further aspect of the present disclosure, there is provided a robotic device control system configured to wirelessly communicate via a radio base station with a robotic device, with a beamforming controller coupled or integral to the radio base station for controlling beamforming between the radio base station and the robotic device. The control system comprises a robotic device controller configured to be coupled to the beamforming controller, wherein the robotic device controller is configured to control the robotic device via the radio base station; and wherein the robotic device control system is configured to provide an instruction, derived by the robotic device control system based on radio beam propagation information of the wireless communication between the radio base station and the robotic device, to the beamforming controller for controlling beamforming between the radio base station and the robotic device.

BRIEF DESCRIPTION OF THE DRAWINGS

These and other aspects of the present disclosure will now be further described, by way of example only, with reference to the accompanying figures, wherein like reference numerals refer to like parts throughout, and in which.

DETAILED DESCRIPTION

Figure 1:
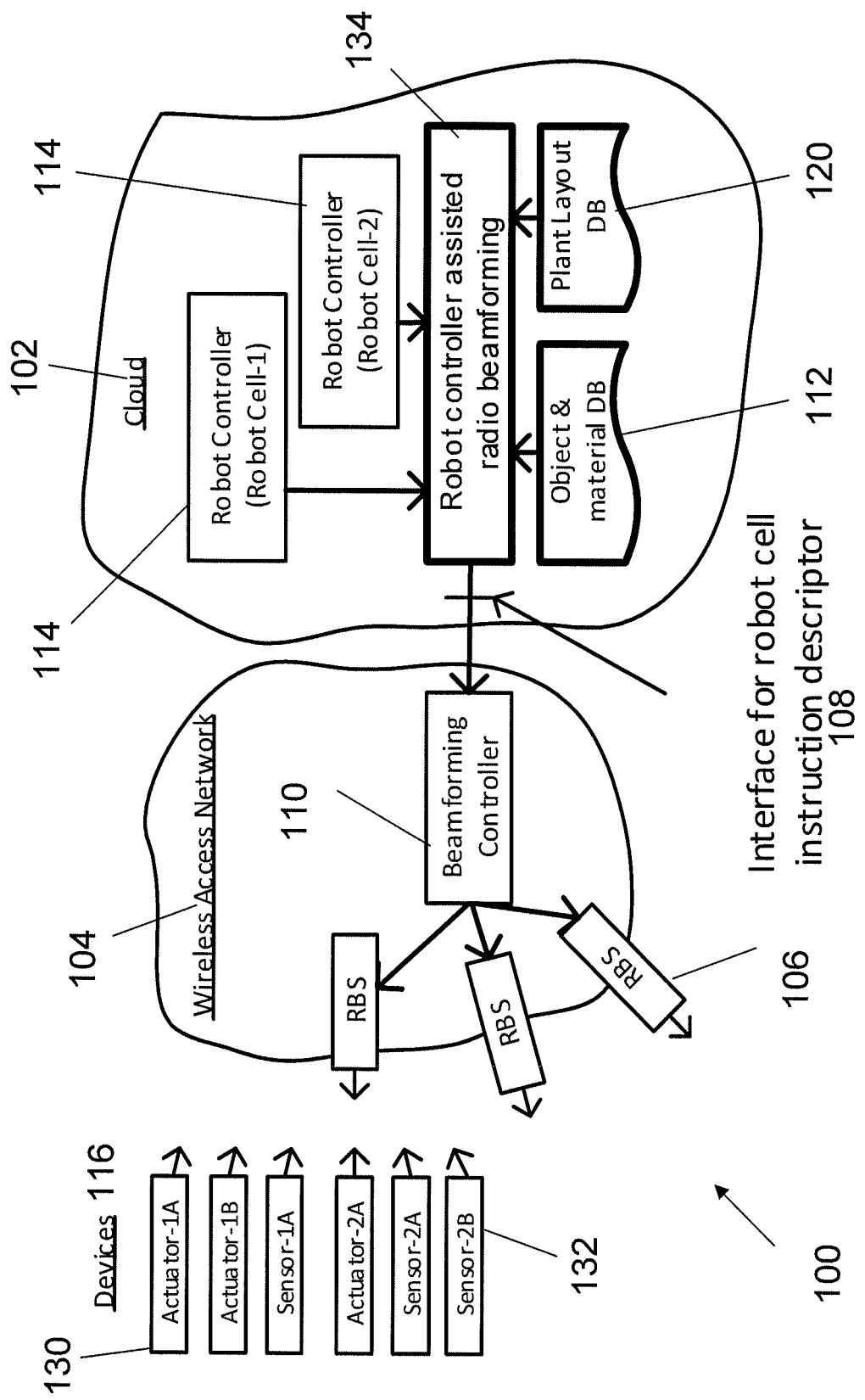
FIG. 1 shows a schematic illustration of a robotic device control system according to some example implementations as described herein.

Advanced antennas are a crucial part of radio access, for example the generation radio access 5G. These antennas will typically be used at high carrier frequencies in order to achieve high throughput. At high frequencies, the propagation becomes more hostile. However, as the carrier frequency gets higher, the antenna elements get smaller. This enables to pack more antenna elements into a smaller antenna. For example, at 15 GHz, it is possible to design an antenna with, for example, 200 elements that is only 5 cm wide and 20 cm tall. With more antenna elements, it becomes possible to create antenna systems where many directed antenna beams are formed to cover a relatively narrow geographical area (called 5G beamforming). Using these advanced antenna techniques, the network may be able to always select a serving beam that has the best coverage for the intended receiver. Since these beams may be quite narrow in terms of beamwidth, and thus, the transmission may be concentrated into a certain direction, the signal strength can be significantly improved, while the interference can be reduced due to the relatively lower number of served receivers per beam.

The beamforming (or beam selection) problem in the radio system (for example the 5G radio system) is about how to form/select a beam to serve the intended receiver dynamically that has the highest channel quality in order to provide the best coverage and minimize interference.

The inventors have realized that in order to solve the above problem, there is a need for a lot of radio measurements to be performed by the devices per beam and sent back to the beamforming controller which takes much time and consumes lots of radio resources.

The inventors have therefore established in particular example implementations of a robot cell aware cloud-assisted beamforming as described herein.

Amongst other features, an interface and a method are described which may allow for more efficient use of wireless beamforming for actuators and/or sensors and/or controllers access in a plant area where multiple robot cells may be deployed.

The interface provides data records to be sent to the beamforming controller of the wireless access network. Data records may contain one or more of the following fields: cell-ID, user-ID, beam direction to robotic device from radio cell, estimated path loss, beam type (i.e. line-of-sight or non-line-of-sight), and validity period.

The method describes the calculation steps of data records. In some implementations, the method regularly updates a three-dimensional map of the plant including all objects. The positions of moving objects may be fetched from corresponding controller(s). Based on the three-dimensional map and associated object material-related information, radio propagations are evaluated between radio base stations and devices. This radio propagated information is published to external components like the wireless access network using the proposed interface. The published data records can be used to optimize for example the beamforming configuration and decrease the number of radio measurements. The proposed information can be used to select the most suitable beam for each robotic device in a proactive way, since information is collected, for instance, about future paths of moving devices, etc.

FIG. 1 shows a schematic illustration of a robotic device control system 100 according to some example implementations as described herein.

In this example, a cloud-computing environment 102 is provided in which a robotic device controller 114 is implemented. In this example, a robot controller (first robotic device controller 114) is provided in the cloud-computing environment 102 for controlling a first robotic cell and a robot controller (second robotic device controller 114) is provided in the cloud-computing environment 102 for controlling a second robotic cell. Hence, the controls of the robotic cells are running in the cloud.

In this example, each robotic cell has its own controller and robotic devices 116 of robotic cells are connected to the cloud-computing environment 102 over the wireless access network 104.

In this example, a robotic controller-assisted radio beamforming unit 134 is provided in the cloud-computing environment 102. The robotic controllers are coupled to the robotic controller-assisted radio beamforming unit 134.

In this example, an object-material database 112 and a layout database 120 of a plant in which the robotic devices are implemented are comprised in the cloud-computing environment 102. The object-material database 112 and the layout database 120 are coupled to the robotic controller-assisted radio beamforming unit 134. The robotic controller-assisted radio beamforming unit 134 may hereby derive the instruction which is sent to the beamforming controller 110 based on data comprised in the object-material database 112 and the layout database 120.

Furthermore, in this example, a robotic device instruction descriptor interface 108 is comprised in the cloud-computing environment 102 for providing the instruction to the beamforming controller 110.

The beamforming controller 110 is comprised in the wireless access network 104 and is coupled, in this example, to each radio base station 106 of a plurality of radio base stations. However, it will be appreciated that each radio base station 106 may, in some example, have its own beamforming controller 110.

In this example, each such radio base station 106 is in wireless communication with each robotic device 116 of a plurality of robotic devices.

Furthermore, in this example, each robotic device 116 comprises one or more actuators 130 and one or more sensors 132. The sensors 132 may, for example, be camera sensors, proximity sensors or audio-based sensors.

In some examples, each robotic device may be controller by one, respective robotic device controller.

The architecture shown in FIG. 1 allows for a Robot Controller Assisted Radio Beamforming (RCARB) method that coordinates and optimizes the wireless communication between the robotic devices 116 and the robot controllers, respectively, to be implemented by providing device direction and propagation loss information to the beamforming controller 110 of the radio access network 104.

In this example, the RCARB method is running in the cloud-computing environment 102 and gets input from the robotic device controllers, the object-material database 112 and the layout database 120 of the plant. In this example, the layout database 120 also contains the location and orientation of the radio base stations (RBSs).

In this example, the RCARB method performs the following tasks.

The RCARB method regularly updates the three-dimensional map of the plant area covered by the RBSs of the wireless access network. In this regard, fixed objects and the plant area may be stored in the layout database 120 of the plant (for example walls, tables, and conveyor belts). Alternatively or additionally, the position and/or orientation of a radio base station may be stored in the layout database 120. Alternatively or additionally, the position and/or orientation of moving controlled objects (for example robot arms) may be collected from the robot controllers and from sensors (for example camera sensor(s)). Alternatively or additionally, the position and/or orientation of externally controlled moving objects (for example automated guided vehicles) or uncontrolled objects (for example human beings) may be collected from sensors (for example camera sensor(s), LIDAR, proximity sensor(s)).

In this example, a material property of each object may be stored in the object-material database 112 in a three-dimensional map which describes radio propagation-related properties (for example attenuation and reflection). These radio propagation-related properties may be taken into consideration when the robotic controller-assisted radio beamforming unit derives the instruction which is to be provided to the beamforming controller.

In this example, the method may be implemented in order to determine the preferred direction(s) from RBS(s) for each wirelessly connected robotic device.

In this regard, line-of-sight propagations may first be checked, and if a line-of-side beam is available, they may be defined as the preferred direction(s). In this step, radio-related properties of objects may, in some examples, not be required.

If line-of-sight propagation is not possible, then a path loss (i.e. the attenuation of signal strength caused by the distance and/or obstructing objects) may be determined and directions with reflection(s) may, in some examples, also be evaluated. In this step, radio-related properties of obstruction objects may be taken into consideration.

The best direction estimates may then be transferred to the beamforming controller 110 of the wireless access network 104, as will be further outlined below.

The beamforming controller 110 may then consider the provided directions in radio beamforming configuration.

In this regard, to example implementations on how that information may be used by the beamforming controller 110 may be implemented alone or in combination.

In a first example implementation, the focus is to significantly reduce the number of radio measurements needed to perform the best beam selection.

If line-of-sight propagation is available to some of the robotic devices, then the beamforming controller 110 validates the best proposed beam using its collected radio measurements on the predicted and N neighboring beams (for example, N=2).

If line-of-sight is not possible, then N is increased, i.e., the beamforming controller 110 has to check more beams. In case accuracy of the best beam estimations provided by RCARB reaches a predetermined threshold $A_{LOS}$ accuracy, then (i) the radio measurement periodicity is decreased to $T_{LOS}$ (for example to 500 ms) and/or (ii) the number of measured beams is decreased to N which can be significantly smaller than the total number of beams. Thereby, the method allows considerably reducing the measurement and reporting load of the wireless devices, such as the robotic devices.

In case the line-of-sight propagation becomes invalid or the (less frequent) radio reporting indicates a different best beam, then the reporting period and/or the number of beams to be measured is increased or adjusted to, for example, the original values, and the algorithm may start over again.

In some examples, the unused and unmeasured beams may even be switched off to increase energy efficiency.

The second example implementation (which may be implemented on its own or in combination with the above-identified first example implementation) aims to achieve proactive behavior so that the beamforming controller 110 can prepare selecting the best beam in advance while devices (including but not limited to the robotic devices) are moving or some uncontrolled external situations occur (human enters, or automated guided vehicle is approaching, etc.).

The proposed information may contain a validity period, as will be further described below, which indicates that the information record is a predicted one and for how far in the future it becomes valid.

If predicted record estimates such a best beam for the next period(s) are not measured by the devices or even switched off, then the beamforming controller 110 may indicate to switch on the beam and start the signal strength measurements with at least $T_{LOS}$ periodicity. In the meanwhile, the beamforming controller 110 starts using the predicted best beam for the given robotic device. Then, this solution can be easily combined with the first example implementations as outlined above in order to achieve proactive behavior, as well as, reducing measurement and reporting burden.

Using predicted best beam information of RCARB, the beamforming controller can easily follow the movement of devices such as automated guided vehicles, robot arms, conveyor belts, humans, etc. very accurately (i.e., by selecting always the best beam for the devices with minimized error).

The proposed method can also work proactively. If the controllers of robot cells know in advance the planned movements in the cells, then the preferred directions can be calculated in advanced and can be sent to the beamforming controller. This may allow for more freedom in beamforming optimization.

The proposed method can efficiently handle robotic devices that have the same direction to RBS(s). If a preferred direction of more robotic devices is the same, then the radio scheduler may allow or be used for separation of these devices (in time and frequency in case of, for example, 5G radio access). If a robotic device can be reached by more RBSs, then the directions may be calculated from each of them and the best fitting may be chosen.

Figure 2:
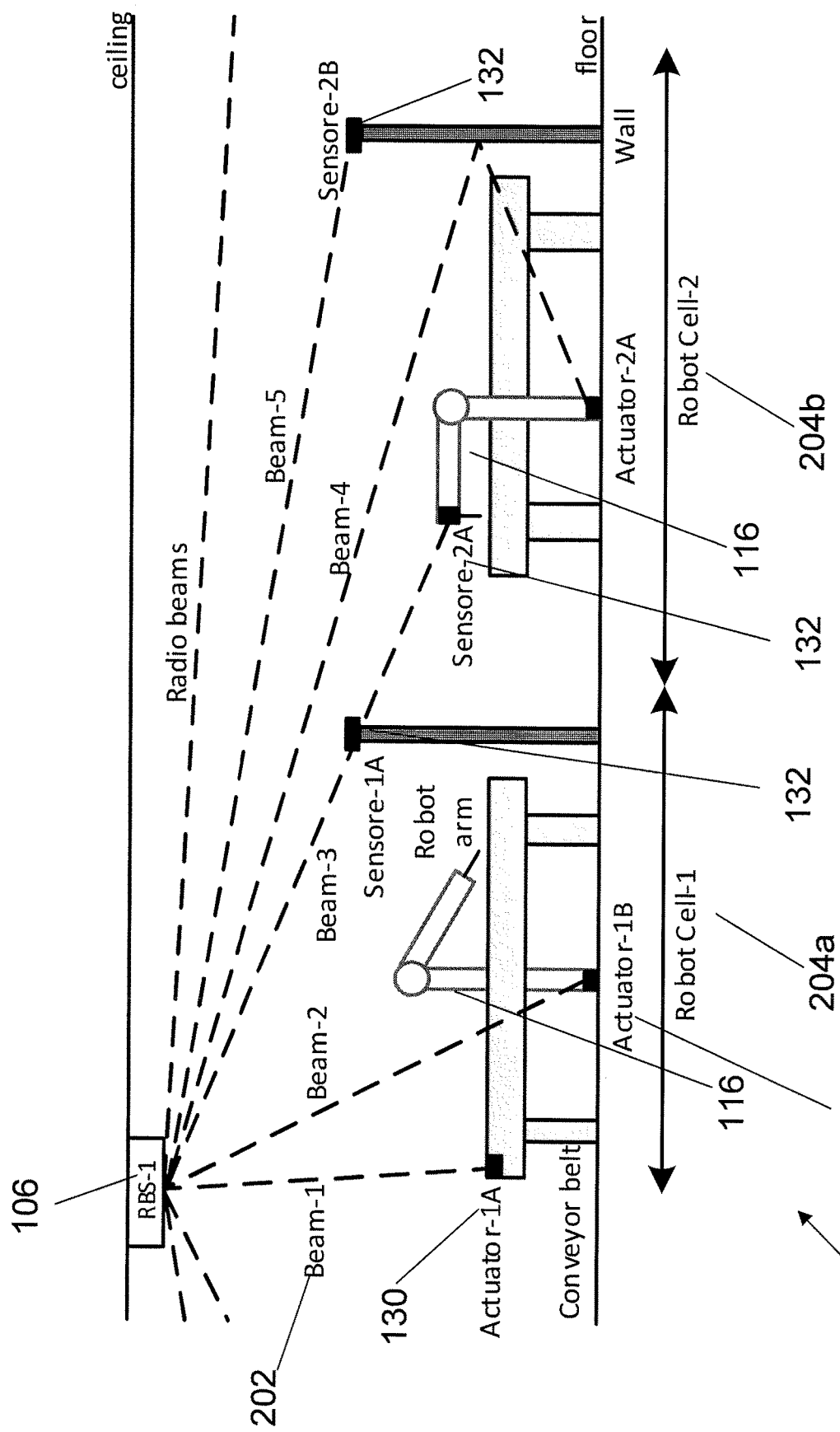
FIG. 2 shows a schematic illustration of a robotic cell plant in which a robotic device control system according to some example implementations as described herein is implemented.

FIG. 2 shows a schematic illustration of a robotic cell plant 200 in which a robotic device control system according to some example implementations as described herein is implemented.

In this example, a radio base station 106 is configured to emit different radio beams in different directions.

The robotic device may have one or more actuators and one or more sensors. A first beam 202 emitted from the radio base station 106 may be in the direction towards the actuator 130.

In this example, the radio base station 106 may serve a first robotic cell 204a and a second robotic cell 204b.

In this example, the first robotic cell 204a has two actuators 130 and one sensor 132 with wireless access. The second robotic cell 204b has, in this example, two sensors 132 and one actuator with wireless access. Some actuators have a fixed position (for example actuator-1B) and others may be attached to moving objects (for example sensor-2A). Some devices are reachable by a line-of-sight beam (for example Beam-1), while others are reachable only by a non-line-of-sight beam (for example Beam-4). Sensor 1A and Sensor 2A have the same line-of-sight direction. For these two devices, data transmission may be separated in time.

Example implementations of systems and methods as described herein may then be used in order to determine the best beam of the potential beams, which may be used for wireless communication between the radio base station and the robotic device, within the beamforming procedure.

Figure 3:
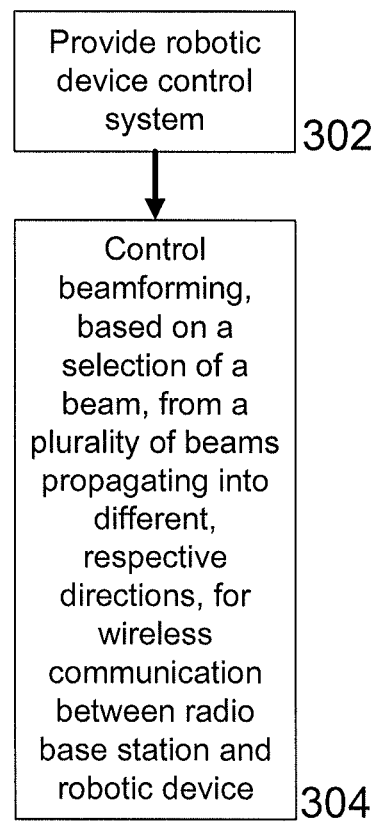
FIG. 3 illustrates a flow-diagram of a method according to some example implementations is as described herein.

FIG. 3 illustrates a flow-diagram of a method 300 according to some example implementations is as described herein.

In step 302, the method comprises providing the robotic device control system of any one of the example implementations and variants as described herein. In step 304, the method comprises controlling beamforming, based on a selection of a beam, from a plurality of beams propagating into different, respective spatial directions, for wireless communication between the radio base station and the robotic device to control the robotic device.

Figure 4:
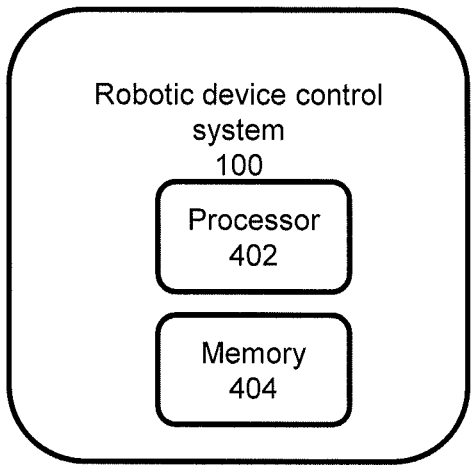
FIG. 4 shows a schematic illustration of a robotic device control system according to some example implementations as described herein.

FIG. 4 shows a schematic illustration of a robotic device control system 100 according to some example implementations as described herein.

In this example, the robotic device control system comprises a processor 402 and a memory 404. The memory 404 may store program code portions which, when executed by the processor 402, allow for performing the method according to any of the example implementations and variants as described herein.

One or both of the processor 402 and the memory 404 may be provided in the cloud-computing environment.

Figure 5:
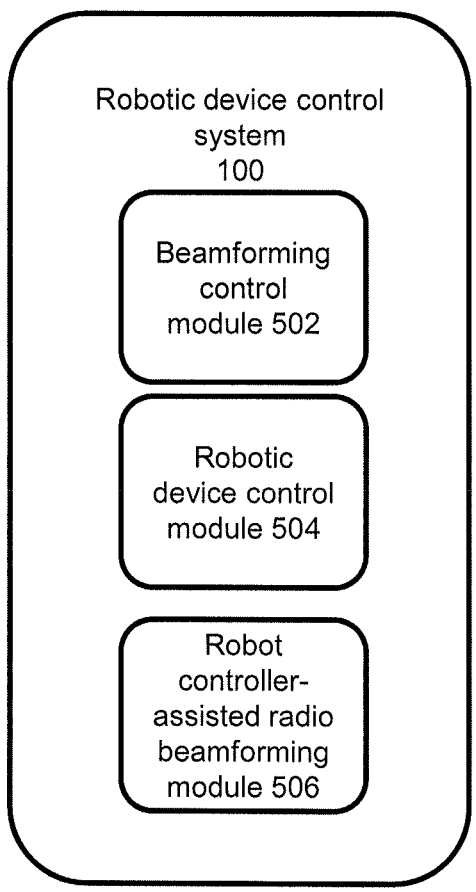
FIG. 5 shows a further schematic illustration of a robotic device control system according to some example implementations as described herein.

FIG. 5 shows a further schematic illustration of a robotic device control system 100 according to some example implementations as described herein.

In this example, the robotic device control system 100 comprises a beamforming control module 502 which allows for controlling beamforming between the radio base station and the robotic device. The robotic device control system 100 further comprises a robotic device control module 504 which allows for control of the robotic device. Furthermore, the robotic device control system 100 comprises a robot controller-assisted radio beamforming module 506 which allows for deriving an instruction based on radio beam propagation information of a wireless communication between the radio base station and robotic device.

As outlined above, data records may contain one or more of the following fields:
robotic device-ID: user idea of wireless robotic device;
cell-ID: cell-ID for a cell served by the beam;
beam index: beams of a device may be sorted by estimated path loss, whereby an index of 0 means the best beam;
beam direction to device from radio cell: direction in Cartesian space from corresponding cell to corresponding device;
estimated path loss: estimated path loss between device and cell;
beam type: line-of-sight or non-line-of-sight;
validity period (start offset and duration): start offset=0 means that this record is valid from a current time, start offset>0 means that this is a predicted record.

In some example implementations as described herein, the beamforming controller may provide feedback on the same interface as outlined above (robotic device instruction descriptor interface) when the estimated best beam indices do not match with the one evaluated based on radio signal strength measurements (performed by, for example, the radio base station or the robotic device). This can be used to refine the RCARB method to correct, for example, the path loss estimates. The proposed feedback information may contain such information as robotic device-ID and/or cell-ID and/or a corrected beam index list.

As will be apparent from the above, a solution is provided that may support the efficient usage of the wireless communication in a production plant where robot arms and other industry devices are available. The proposed solution uses, in some examples, a central cloud where knowledge bases of device positions and orientations, object locations, object materials, etc. are collected and maintained. This information may be processed by the proposed solutions and input is provided for the radio base station to enhance the wireless link, for example, by adjusting the beamforming accordingly.

Example implementations as described herein may be implemented in a cloud robotics platform which may support in particular 5G.

Example implementations of the robotic device control system and method allow for efficient and more coordinated use of wireless beamforming for actuators and/or sensors and/or controllers access in a plant area where multiple robot cells may be deployed and controlled from cloud.

Using the proposed solution, the wireless communication can be optimized and higher spectral efficiency, less transmission power, better coverage and less interference can be realized.

The high measurement burden of beamforming may hereby be reduced.

Furthermore, energy efficiency of the wireless access network may be increased.

A further advantage of the proposed solution is that it can increase reliability of the wireless connection, in particular since the beamforming controller can prepare to sudden changes of the radio condition proactively. High reliability may be especially important in case of industrial applications.

No doubt many other effective alternatives will occur to the skilled person. It will be understood that the present disclosure is not limited to the described variants and encompasses modifications apparent to those skilled in the art and lying within the scope of the claims appended hereto.

The invention claimed is:

1. A robotic device control system, comprising:
a radio base station for wireless communication with a robotic device;
a beamforming controller coupled or integral to the radio base station for controlling beamforming between the radio base station and the robotic device; and
a robotic device controller comprised in a cloud-computing environment, wherein the robotic device controller is coupled to the beamforming controller comprised in a wireless access network, wherein the robotic device controller is configured to control the robotic device via the radio base station, and wherein the robotic device controller comprised in the cloud-computing environment sends instruction to the beamforming controller comprised in the wireless access network for controlling the beamforming between the radio base station and the robotic device, the instruction is sent via the wireless access network;
wherein the robotic device control system is configured to provide the instruction, derived by the robotic device control system based on radio beam propagation information of the wireless communication between the radio base station and the robotic device, to the beamforming controller for controlling beamforming between the radio base station and the robotic device, and wherein the robotic device control system is configured to derive the radio beam propagation information based on a three-dimensional map of an area coverable by beams of the radio base station.

2. The robotic device control system as claimed in claim 1, wherein the beamforming relates to a spatial selectivity with respect to beams, emitted by the radio base station in different, respective directions, from which one beam is selected for the wireless communication.

3. The robotic device control system as claimed in claim 1, wherein the robotic device controller is coupled to the beamforming controller via a robotic controller-assisted radio beamforming unit which is configured to derive the instruction provided to the beamforming controller for controlling beamforming between the radio base station and the robotic device, wherein the robotic controller-assisted radio beamforming unit is comprised in the cloud-computing environment, and/or the robotic device control system further comprising a robotic device instruction descriptor interface comprised in the cloud-computing environment for providing the instruction to the beamforming controller.

4. The robotic device control system as claimed in claim 1, wherein the radio beam propagation information comprises a beam type identifying whether a beam formed between the radio base station and the robotic device is a line-of-sight beam or a non-line-of-sight beam, and wherein the robotic device control system is configured to prioritize, for the wireless communication, line-of-sight beams over non-line-of-sight beams during the beamforming control.

5. The robotic device control system as claimed in claim 4, wherein the robotic device control system is further configured to determine a signal strength attenuation of the beam caused by one or both of (i) a distance between the radio base station and the robotic device, and (ii) an object obstructing a wireless communication path between the radio base station and the robotic device, and wherein the deriving of the instruction provided to the beamforming controller is based on the determined signal strength attenuation.

6. The robotic device control system as claimed in claim 4, wherein the robotic device control system is further configured to determine a reflection direction of the non-line-of-sight beam from a surface, and wherein the deriving of the instruction provided to the beamforming controller is based on the determined reflection direction.

7. The robotic device control system as claimed in claim 5, wherein the robotic device control system further comprises an object-material database in which a radio beam-related property of one or both of the obstructing object and the surface is stored, and wherein the deriving of the instruction provided to the beamforming controller, for controlling the non-line-of-sight beam, is based on the radio beam-related property, wherein the object-material database is comprised in the cloud-computing environment.

8. The robotic device control system as claimed in claim 4, wherein, if line-of-sight propagation is available for M beams of a plurality of beams formed between the radio base station and the robotic device, the instruction comprises a first identification of the M beams including an order of preference of the M beams for the wireless communication, and wherein the beamforming controller is configured to validate a first beam of the M beams for the wireless communication for which a highest preference among the M beams has been identified and to validate N second beams of the plurality of beams for the wireless communication, wherein the N second beams are neighboring beams of the first beam of the M beams, the validations being based on radio measurements performed by the robotic device control system on the first beam of the M beams and the N second beams, and wherein the beamforming controller is configured to establish the wireless communication based on the first beam or one of the N second beams according to the validations.

9. The robotic device control system as claimed in claim 8, wherein the M beams comprise the N second beams and/or, wherein, if no line-of-sight propagation is available, the robotic device control system is configured to increase the number N of second beams validated by the beamforming controller, and wherein the beamforming controller is configured to establish the wireless communication based on one of the N second beams according to the validations.

10. The robotic device control system as claimed in claim 9, wherein, if no line-of-sight propagation is available, the robotic device control system is configured to:
    determine whether a property of the wireless communication which is established based on the one of the N second beams satisfies a condition, and
    if the condition is satisfied, vary one or both of (i) a time interval between consecutive radio measurements and (ii) the number N of second beams, wherein the condition is based on a line-of-sight propagation-based property of the wireless communication determined previously by the robotic device control system, and/or wherein, when the line-of-sight propagation becomes invalid and/or the beam for which the highest preference for the wireless communication has been identified changes, the robotic device control system is configured to vary one or both of a periodicity of the radio measurements and a number of the beams to be validated and/or, wherein the robotic device control system is configured to switch off beams, of the plurality of beams, which are not validated by the beamforming controller.

11. The robotic device control system as claimed in claim 1, wherein the robotic device control system is configured to process movement data relating to a movement of one or both of the robotic devices and a third object to obtain predicted movement data indicating a predicted position and/or a predicted orientation of the robotic device and/or the third object, wherein the instruction to the beamforming controller comprises the predicted movement data for controlling beamforming between the radio base station and the robotic device for a later point in time compared to when the movement data is obtained and/or processed, and/or wherein the robotic device control system is configured to predict one or both of the position and orientation of the robotic device based on instruction data communicated to the robotic device.

12. The robotic device control system as claimed in claim 11, wherein the instruction further comprises validity period information indicating a maximum time period between when the movement data is obtained and the later point in time, and/or, wherein, when a radio propagation measurement relating to a beam determined for use for the wireless communication at the later point in time is not performed at a current time, the robotic device control system is configured to initiate the radio propagation measurement for said beam, and wherein initiating the radio propagation measurement for said beam comprising switching on said beam if the beam is switched off at the current time.

13. The robotic device control system as claimed in claim 11, wherein the movement data is processed by the beamforming controller, wherein the radio beam propagation information comprises data relating to an interference of different beams used to communicate with the robotic device, and wherein the interference comprises interferences of beams formed by different radio base stations.

14. The robotic device control system as claimed in claim 1, wherein the radio base station comprises a plurality of radio base stations, and wherein the instruction to the beamforming controller for controlling beamforming between the radio base station and the robotic device is derived based on a comparison of radio beam propagation information of the wireless communication between the robotic device and each respective one of the plurality of radio base stations.

15. The robotic device control system as claimed in claim 1, wherein the beamforming controller is configured to provide feedback regarding the derived instruction in relation to a preferred beam utilized for the wireless communication, and wherein the robotic device control system is configured to refine the beamforming based on a comparison, using the feedback, between the derived instruction and a radio signal strength measurement-based beam evaluation.

16. The robotic device control system as claimed in claim 1, wherein the robotic device control system is configured to update the three-dimensional map based on objects, in particular the robotic device, moving within the area, and/or the robotic device control system comprising a layout database storing information regarding the three-dimensional map, wherein deriving the instruction based on the radio beam propagation information is based on the information stored in the layout database.

17. A method for controlling a robotic device, the method comprising:
providing the robotic device control system of claim 1, and
controlling beamforming, based on a selection of a beam, from a plurality of beams propagating into different, respective spatial directions, for wireless communication between the radio base station and the robotic device to control the robotic device.

18. A robotic device control system configured to wirelessly communicate via a radio base station with a robotic device, with a beamforming controller being coupled or integral to the radio base station for controlling beamforming between the radio base station and the robotic device, the control system comprising:
a robotic device controller configured to be coupled to the beamforming controller, wherein the robotic device controller is configured to control the robotic device via the radio base station and wherein the robotic device controller comprised in a cloud-computing environment sends instruction to the beamforming controller comprised in a wireless access network for controlling the beamforming between the radio base station and the robotic device, the instruction is sent via the wireless access network; and
wherein the robotic device control system is configured to provide the instruction, derived by the robotic device control system based on radio beam propagation information of the wireless communication between the radio base station and the robotic device, to the beamforming controller for controlling beamforming between the radio base station and the robotic device, and wherein the robotic device control system is configured to derive the radio beam propagation information based on a three-dimensional map of an area coverable by beams of the radio base station.

\* \* \* \* \*